United States Patent [19]
Tillander et al.

[11] Patent Number: 5,989,368
[45] Date of Patent: Nov. 23, 1999

[54] CARPET POSITION SENSOR

[75] Inventors: Thomas Tillander, Bay Village; Dennis K. Mull, Concord, both of Ohio

[73] Assignee: The North American Manufacturing Company, Cleveland, Ohio

[21] Appl. No.: 08/918,258

[22] Filed: Aug. 6, 1997

[51] Int. Cl.[6] ............................. B23Q 15/24; B32B 5/06; B32B 31/10

[52] U.S. Cl. ............................. 156/64; 156/72; 156/363; 156/378; 156/379; 226/3; 226/15; 226/45

[58] Field of Search .................................. 156/361, 64, 72, 156/363, 378, 379; 226/15, 18, 19, 20, 45, 3; 242/563, 563.1

[56] References Cited

U.S. PATENT DOCUMENTS

| | | |
|---|---|---|
| 3,238,595 | 3/1966 | Schwartz et al. . |
| 3,957,568 | 5/1976 | Abel . |
| 3,972,254 | 8/1976 | Dillinger et al. . |
| 4,160,517 | 7/1979 | Buisker ..................................... 226/19 |
| 4,222,809 | 9/1980 | McLean et al. . |
| 4,241,507 | 12/1980 | Clarey . |
| 4,384,686 | 5/1983 | Wiley ..................................... 242/57.1 |
| 4,392,910 | 7/1983 | Tokuno ..................................... 156/361 |
| 4,500,045 | 2/1985 | Whitaker ..................................... 242/57.1 |
| 4,579,763 | 4/1986 | Mitman . |
| 5,328,072 | 7/1994 | Ruessmann ..................................... 226/15 |
| 5,460,312 | 10/1995 | Brau ..................................... 226/15 |

*Primary Examiner*—Richard Crispino
*Assistant Examiner*—George R. Koch, III
*Attorney, Agent, or Firm*—Vickers, Daniels & Young

[57] ABSTRACT

A position detector senses an undulating pile tuft edge position of a carpet as it is processed in a carpet making machine by detecting attenuated light passing through the carpet's primary backing material to determine the exact position of the carpet's undulating pile tuft edge at any given time. Sensor signals from the detector are digitally filtered through one pole cascaded filters to produce an average pile edge position signal which, in turn, controls actuators for secondary and primary backing material guide rolls to not only center the carpet for aligned entry into the carpet machine's tenter, but also apply the secondary backing material to the primary backing material at a precise position.

41 Claims, 6 Drawing Sheets

CARPET POSITION SENSOR

This invention relates generally to carpet making machines and processes and more particularly to a detector arrangement for sensing the center and carpet backing position of the carpet as it travels through the machine.

The invention is particularly applicable to a carpet making machine in which on the fly positioning of the carpet is achieved by sensing the edge positions, width and centerline of carpet tufting and will be described with specific reference thereto. However, it will be appreciated by those skilled in the art that the invention may have broader application and could be applicable as a position sensing device for any moving laminated, woven fabric composition having translucent or translucent/opaque portions.

INCORPORATION BY REFERENCE

The following patents are incorporated by reference herein as indicative of the state of the art so that the specifications of this patent need not describe in detail conventional features known to those skilled in the art:

- U.S. Pat. No. 3,238,595 to Schwartz et al. entitled "Method of Producing Tufted Carpets";
- U.S. Pat. No. 3,957,568 to Abel entitled "Cutter for a Non-Woven Carpet Machine";
- U.S. Pat. No. 4,222,809 to McLean et al. entitled "Apparatus for and Method of Removing Scrap Ribbons Trimmed from a Carpeting Strip";
- U.S. Pat. No. 4,241,507 to Clarey entitled "Apparatus and Method for the Determination of Tenter width Variance in a Carpet or Textile Drying Oven"; and,
- U.S. Pat. No. 4,579,763 to Mitman entitled "Process for Forming Densified Tufted Carpet Tiles by Shrinking Primary Backing".

The patents incorporated herein by reference do not form any part of the present invention.

BACKGROUND

In the manufacture of carpet, tufts of carpet fabric or yarn or pile (i.e., "pile tufts") are affixed by a needle tufting process to a primary backing material such as jute or a polyolefin material which can be characterized as loosely or tightly woven. The tufts may be woven into one backing material or, as illustrated in U.S. Pat. No. 3,957,568, may be woven into a sandwich formed between two spaced, parallel primary backing materials. The "sandwich" is subsequently cut down its center to form two carpets. Adhesive may be applied to the primary backing material to hold the tufts in their woven position. The tufts are woven by the needle tufting process into the primary backing material in staggered rows to avoid lines between the tufts showing in the finished carpet. Staggering the rows results in undulations or waves of pile tufts approaching and receding the straight width edge of the carpet, i.e., the primary backing material. While the undulations for any given carpet may be somewhat periodic since the tufting process is consistent, the undulations vary in amplitude and frequency or height and length from carpet to carpet. The pile tufts are woven into the primary backing material so that an end width space is typically left between the undulating carpet pile edge and the straight edge of the primary backing material.

A secondary backing material, typically a latex secondary backing coated with an adhesive or a thermoplastic coated scrim, is then attached to the primary backing material and the carpet with its primary and secondary backing material is applied or stretched onto the pins of a tenter. Those pins typically catch the primary backing material in the width end space between the undulating carpet pile tuft edge and the width edge of the primary backing material. As the carpet is heated while it travels the length of the tenter, the adhesive dries and the backing material, especially the secondary backing material, shrinks to increase the density of the pile tufts (as explained in U.S. Pat. No. 4,579,763) while the tenter stretches the carpet to avoid carpet curl so that the carpet will lie flat when installed. The carpet edges are then trimmed to standard commercial carpet widths and wound onto rolls for transport.

It is appreciated that the stretching and drying operation performed by the tenter is critical to a high speed process forming a continuous longitudinally extending carpet. The carpet must be accurately aligned so that it can be consistently gripped by the tenter pins at the proper position to not only prevent line downtime but to also assure a properly constructed carpet. It is important then that the secondary backing material underlie the tufts of the carpet. Accordingly, the secondary backing material is supplied in widths at dimensions in excess of the pile tuft width to make sure the secondary backing material underlies the pile tufts even if the excess extends to the tenter pins gripping the primary backing material. The excess width of the secondary backing material is subsequently trimmed and discarded as scrap resulting in a more expensive carpet than what is otherwise required.

Photoelectric devices have been used to detect the straight edge position of the carpet and adjust the carpet position accordingly. U.S. Pat. No. 4,222,809 shows the use of photoelectric devices to sense opposite straight side edges of the outer covering of a foam backed carpet which are used to make adjustments to the carpet guiding mechanism to assure positioning of the opposed fabric edges of the outer covering into the tenter (the foam backing being applied in a subsequent step). The photoelectric device works in a conventional manner to determine the straight edge of the carpet's outer covering by determining the position where light passes unimpeded to a sensor. In jute backed carpets of the type to which this invention relates, it is believed similar detector devices have been used to determine the straight edge position of the primary backing material. Such arrangements assure centering of the carpet between outside edges of the primary backing material so that the carpet can be fed in an aligned manner into the tenter to minimize tenter downtime. They do not address centering of the carpet by the pile tufts so that unnecessary scraps of the secondary backing material can be alleviated nor do they tend to enhance the consistent performance of the tenter which would otherwise occur if the pile and not the carpet edges were centered in the tenter.

SUMMARY OF THE INVENTION

Accordingly it is a principal object of the invention to provide a light sensor arrangement (method and apparatus) in a carpet making machine which senses the side or width edge position of the pile tuft undulations or waves to more accurately center the carpet within the machine.

This object along with other features of the invention is achieved in a carpet making machine of the type in which tufts of carpet pile are affixed to a generally transparent open weave primary backing material in a staggered offset row pattern to cause the pile tufts to form a longitudinally extending undulating pile edge approaching and receding from the side width edges of the primary backing material.

The invention includes a first plurality of light sources spaced on one side of the carpet with the light sources positioned on a line extending towards the center of the carpet at spaced increments from a point positioned outside the carpet width and a first plurality of light sensors spaced on the opposite side of the carpet and aligned with the first plurality of light sources so that each sensor can sense any attenuated light passing from an aligned light source through the carpet, specifically the carpet backing material. A signal processing arrangement, effective when the light sources are activated, determines, from the sensor signals at any given time, the average undulating tuft pile edge position while the carpet passes between the light sources and sensors which is then used to center the carpet based on the carpet pile position and not the carpet edge position.

In accordance with still yet another feature of the invention, a second plurality of light sources and sensors is provided at the opposite width edge of the carpet to produce a second plurality of signals which are simultaneously processed along with the first plurality of sensor signals to arrive at average pile tuft wave or undulation signals for both side widths of the carpet which are averaged to produce the centering signal.

In accordance with another important feature of the invention, an adhesive coated, generally transparent, secondary backing material is conveyed by guide rolls to a position, underneath and in contact with the primary backing material to form a composite backing. The centering signals are applied to actuators controlling the transverse position of the secondary guide rolls to properly center the secondary backing material under the pile tufts thereby minimizing the width of the secondary backing material.

In accordance with an extended feature of the invention, the light sources and sensors can be positioned to extend over the composite backing of the carpet upstream of the tenter. The light sensors are able to distinguish attenuated light passing only through the primary backing material, attenuated light passing through both the primary and secondary backing materials and unimpeded light passing outside the primary backing material to either produce a verification signal or a delayed centering signal applied to the guide rolls of the secondary backing material and/or the guide rolls of the primary backing material.

It is thus another object of the invention to provide a detector arrangement for use in a carpet making machine which measures the side edge position of the carpet tufts to permit use of a secondary backing material having a minimum width.

It is yet another object of the invention to provide a detector arrangement for use in a carpet making machine which tends to enhance the performance of the tenter resulting from centering the pile tufts (and not the carpet edges) to promote even drying and stretching.

Still another object of the invention is to provide an improved light sensor detector which can be variably set to distinguish light intensities passing through an object for positioning the object.

Yet another object of the invention is to provide a method for centering the carpet in a carpet making machine by utilizing the ability of a photo detector to sense light through the primary and secondary carpet backing materials at the width ends of the carpet to either center or verify the centering of the carpet including centering of the secondary and primary backing materials in the machine.

Still another basic object of the invention is to provide a simple and inexpensive position detector for maintaining a carpet continuously centered in a carpet making machine.

An important object of the invention is to provide an inexpensive light detector which has a wide field of view.

Still another object of the invention is to provide a simple light detector with a wide field of view which actuates a plurality of sensors in a sequence during a scan to determine the position where light of a set intensity passes through an object.

A specific object of the invention is to provide an edge detector for use in a carpet making machine which has a wide field of view to permit the carpet making machine to process a number of standard width carpets as well as any given carpet without having to adjust detector position minimizing machine set-up and down time.

Yet another object of the invention is to provide a detector which senses instantaneous pile tuft edge positions to simultaneously generate an average pile tuft edge position which is utilized to not only assure proper alignment of the carpet with the tenter but also alignment of the secondary backing material relative to the pile tufts to minimize the width of the secondary backing material and reduce scrap.

These and other objects of the invention will become apparent to those skilled in the art upon reading and understanding the Detailed Description of the Invention set forth below.

BRIEF DESCRIPTION OF THE DRAWINGS

The invention may take physical form in certain parts and arrangement of parts, a preferred embodiment of which will be disclosed in detail and illustrated in the accompanying drawings which form a part hereof and wherein.

DETAILED DESCRIPTION OF THE INVENTION

Figure 1:
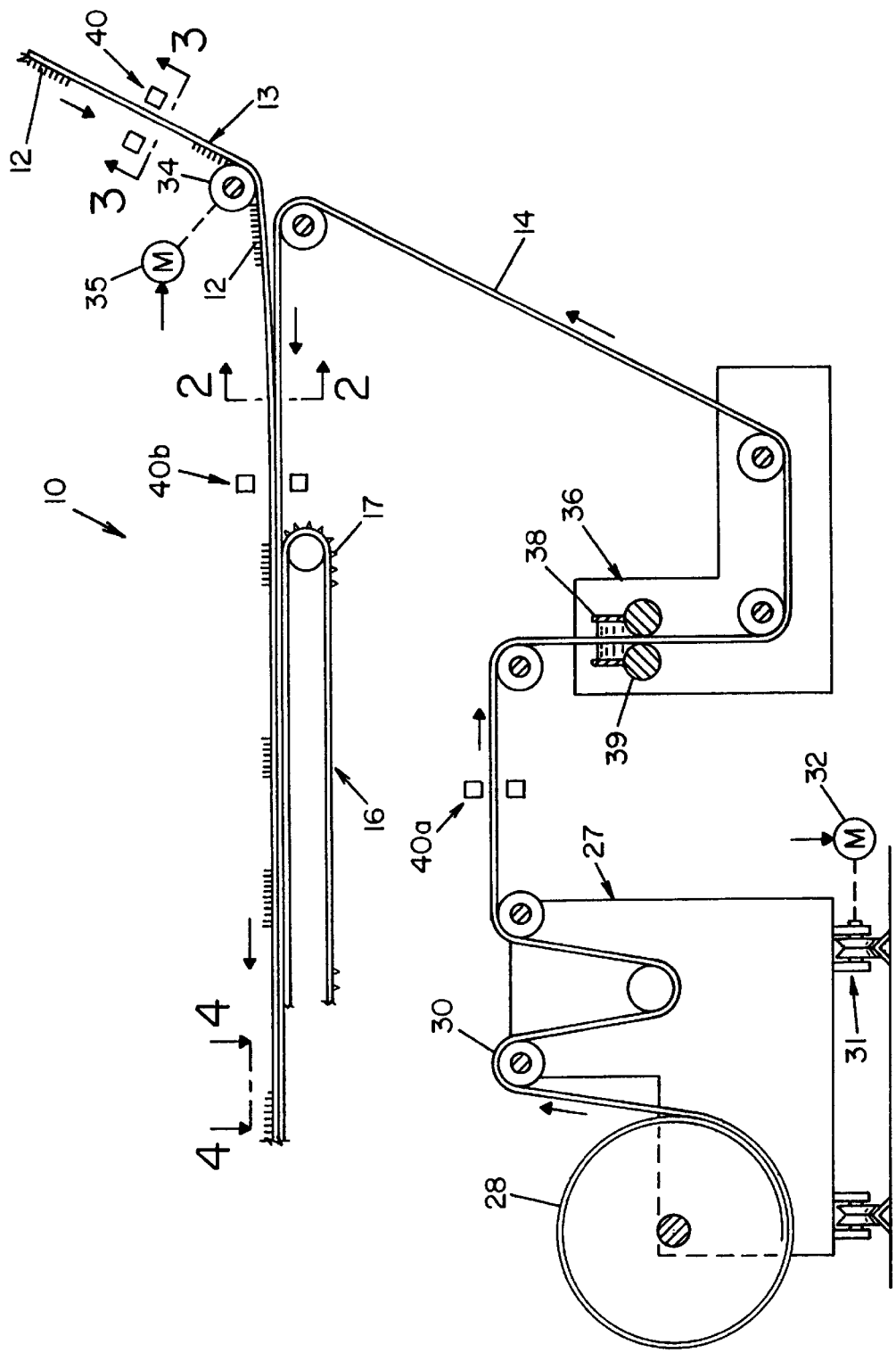
FIG. 1 is a schematic plan view of that portion of a carpet making machine to which this invention relates.

Referring now to the drawings wherein the showings are for the purpose of illustrating a preferred embodiment of the invention only and not for the purpose of limiting the same, there is shown in FIG. 1, a portion of a carpet making machine 10. Diagrammatically illustrated in FIG. 1 are pile tufts 12 woven into a primary backing material 13 and a secondary backing material 14 which, as shown, is positioned underneath primary backing material 13. Primary backing material 13 with pile tufts 12 and secondary backing material 14 travel in the direction of the arrows shown in FIG. 1 and pass through a conventional tenter 16 having a conventional gripping mechanism schematically shown for illustration purposes as pins 17.

Pile tufts 12, primary backing material 13 and secondary backing material 14 are entirely conventional. Pile tufts 12 are made of any conventional yarn such as nylon, polyester, cellulosic, acrylic or polyolefin and the primary backing material is a conventional woven backing such as jute or a plastic spun-bonded material such as polyolefin. Secondary backing material 14 is typically a woven backing applied to primary backing material 13 with adhesives (latex or resin) and typically is a latex or a hot melt or a thermoplastic coated scrim.

There are a number of different processes used to make the carpet, all of which can employ the present invention. The typical process uses a multiple needle tufting machine employing a row(s) of needles carrying the pile yarns passing through the weave or spaces in the primary backing material 13 and employ looping members to hold the yarn in place. A variation is disclosed in U.S. Pat. Nos. 3,972,254 and 3,957,568 in which the yarn is looped through two parallel primary backing materials 13 to form a sandwich which sandwich is then cut in half to form two carpets. A latex adhesive may then be applied to the primary backing material. The primary backing material 13 with pile tufts 12 and adhesive may then pass through a tenter which heats the material causing a shrinkage and a densification of the pile tufts. In this type of process (described in U.S. Pat. No. 4,579,763), secondary backing material 14 is subsequently applied to the shrunk, densified carpet in a second tenter. Alternatively, secondary backing material 14 coated with an adhesive is applied to primary backing material 13 with pile tufts 12 and passed through a tenter which will heat and dry the adhesive to shrink and densify the pile tufts while stretching the carpet to insure that it will lie flat. The detector of the present invention works with any of the processes. FIG. 1 illustrates only that portion of the machine or process in which secondary backing material 14 is applied to primary backing material 13 prior to being fed into tenter 16, it being understood that primary backing material 13 may or may not have a latex coating or adhesive applied thereto.

Figure 2:
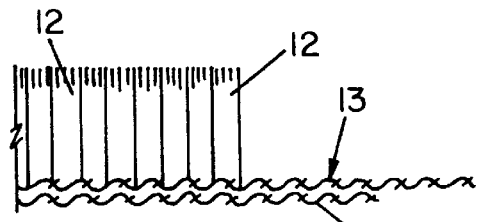
FIG. 2 is a cross-sectional view of the carpet including its primary backing material and secondary backing material taken along lines 2—2 of FIG. 1.
Figure 4:
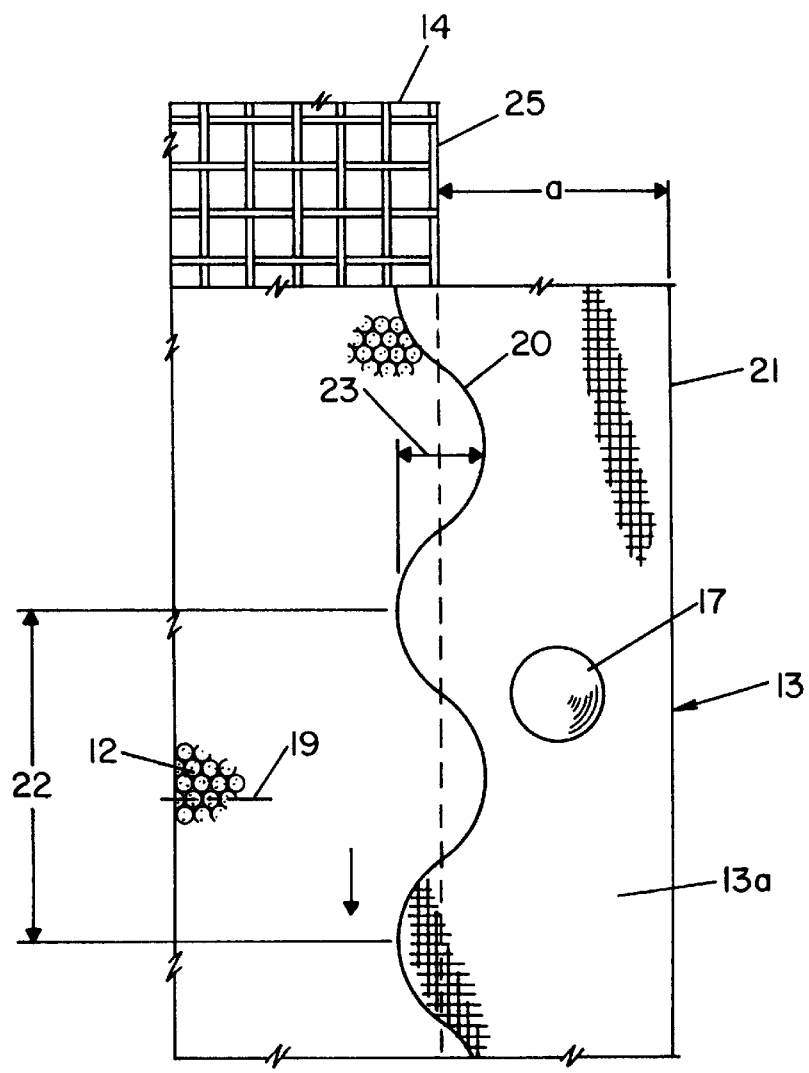
FIG. 4 is a plan view of the carpet with sections broken away to illustrate the secondary backing material underneath the primary backing material taken along lines 4—4 of FIG. 1.

Referring now to FIGS. 2 and 4, and specifically FIG. 4, the weave of secondary backing material 14 is shown as being more open than the weave of primary backing material 13 and pile tufts 12 are shown arranged in rows 19 which are staggered in relation to one another. Staggering of rows 19 is conventionally used to avoid lines appearing between tufts running the length or the width of the carpet so the needle tufting machine shifts the looping and offsets the rows and produces a wave shaped or undulating pile edge 20 at the width end of the carpet. For definitional purposes, the carpet width edge (or the end of the width of the carpet) is defined as the width edge 21 of primary backing material 13. As shown, undulating pile edge 20 forms a continuous series of waves 22 which for any given carpet are more or less regular because the needle tufting machine is more or less regular in its looping motion. However, pile edge 20 varies from carpet to carpet and prevents the use of any measurement technique which can constantly factor an edge dimension to arrive at a pile tuft position. More specifically, the amplitude designated by reference numeral 23 of each wave 22 varies as the position of undulating pile edge 20 approaches and recedes from primary backing width edge 21 and different carpets will produce different waves. As shown, pile tufts 12 are not threaded into primary backing material 13 to the extent that undulating pile edge 20 contacts primary backing width edge 21 but an unwoven side edge area or space 13a is left. Side edge area 13a is shown by dimension "a" in FIG. 4. Conventionally, the tenter gripping mechanism, schematically shown as tenter pins 17, will punch through primary backing material 13 to fix the carpet in side edge area 13a onto tenter 16. This avoids marking the carpet (punching through pile tufts 12).

In theory, and when the invention is practiced, secondary backing width edge 25 need be positioned only underneath the midway point of waves 22. Any secondary backing material 14 falling underneath primary backing side edge area 13a is wasted material. Because conventional sensors sense only width edges, secondary backing material 14 typically overlies side edge area 13a which is subsequently trimmed from the carpet when leaving tenter 16. The detector of the present invention senses undulating pile edge 20 so that the width of secondary backing material 14 can be narrowed to a dimension for precisely positioning secondary backing material 14 beneath undulating pile edge 20 while using undulating pile edge 20 to also provide the alignment measurement for guiding the carpet into tenter 16.

Referring now again to FIG. 1, there is schematically shown a payout station 27 which includes a payout reel 28 upon which secondary backing material is coiled. Secondary backing material 14 is drawn from payout reel 28 into an appropriate width position by secondary guide rolls 30. A transverse actuator schematically illustrated by reference numeral 31 is driven by a detector controlled motor 32 to cause secondary guide rolls 30 to control the position of secondary backing width edges 25. With reference to FIG. 1, transverse actuator 31 shifts secondary backing material 14 into and out of the plane of the paper. Similarly, a primary guide roll (designated for drawing convenience as the roll indicated by reference numeral 34) is likewise provided to control the width positioning of primary backing material 13. Primary guide roll 34 is likewise provided with a transverse actuator (not shown) driven by a detector controlled motor 35. Secondary backing material 14, after leaving payout station 27 passes through an adhesive station 36 which includes an adhesive tank 38 having rollers 39 for applying an adhesive such as latex or a thermoset resin to secondary backing material 14. As explained above, secondary backing material 14 is driven and maintained in a precise width guided position by secondary guide rolls 30 from payout station 27 through adhesive station 36 into contact with the underside of primary backing material 13 which has pile tufts 12 secured thereto and is likewise conveyed in a controlled width position manner by primary guide rolls 34. Secondary backing material 14 and primary backing material 13 are conveyed into contact with one another to form a composite backing material upstream of tenter 16. The carpet is then conveyed through tenter 16 where the adhesive is typically dried and the carpet shrunk as a result thereof to densify pile tufts 12 while stretched to maintain a flat condition. The side edges of the carpet are then trimmed and the carpet rolled onto windup reels for shipment as commercial rolls of carpeting. Carpet making machine 10 as thus described is entirely conventional.

In accordance with the invention, a position sensing detector 40 is provided to sense undulating pile edge 20 and provide signals to adjust the position of secondary backing material 14 through secondary guide rolls 30 as well as the position of primary backing material 13 through primary guide rolls 34 for alignment with tenter 16. In the preferred embodiment, position detector 40 is positioned upstream of tenter 16 at a sufficient distance to permit corrective action by transverse actuator 31 and transverse actuator for primary backing material 13 in a sufficient time so that primary backing material 13 and secondary backing material 14 are aligned prior to entering tenter 16. Thus, the relative position of position detector 40 shown in FIG. 1 is the position at which position detector 40 will generate corrective control signals to primary guide roll 34 and secondary guide roll 30.

While it is a principal feature of the invention to provide a detector to determine the position of undulating pile edge 20 and use that position to control carpet centering, those skilled in the art will recognize from the description of detector 40 which follows, that position detector 40 can additionally develop other edge position signals. Accordingly, additional position detectors can be provided at other locations within carpet machine 10 such as shown by the location of additional detectors 40a and 40b in FIG. 1. Position detector 40a would operate as a conventional photo detector to additionally monitor the width positioning of secondary backing material 14 by sensing the position of secondary backing width edge 25, normally a straight edge. Optionally, position detector 40a would compare its signals to that developed by corrective position detector 40 to produce an error signal applied to motor 32 for adjusting transverse actuator 31. Position detector 40b could monitor pile edge 20 position, secondary backing width edge 25 position and primary backing width edge 21 position to insure proper alignment of primary backing material 13 and secondary backing material 14 prior to entering tenter 16. Other positions within carpet making machine 10 for mounting position detectors will suggest themselves to those skilled in the art.

Figure 3:
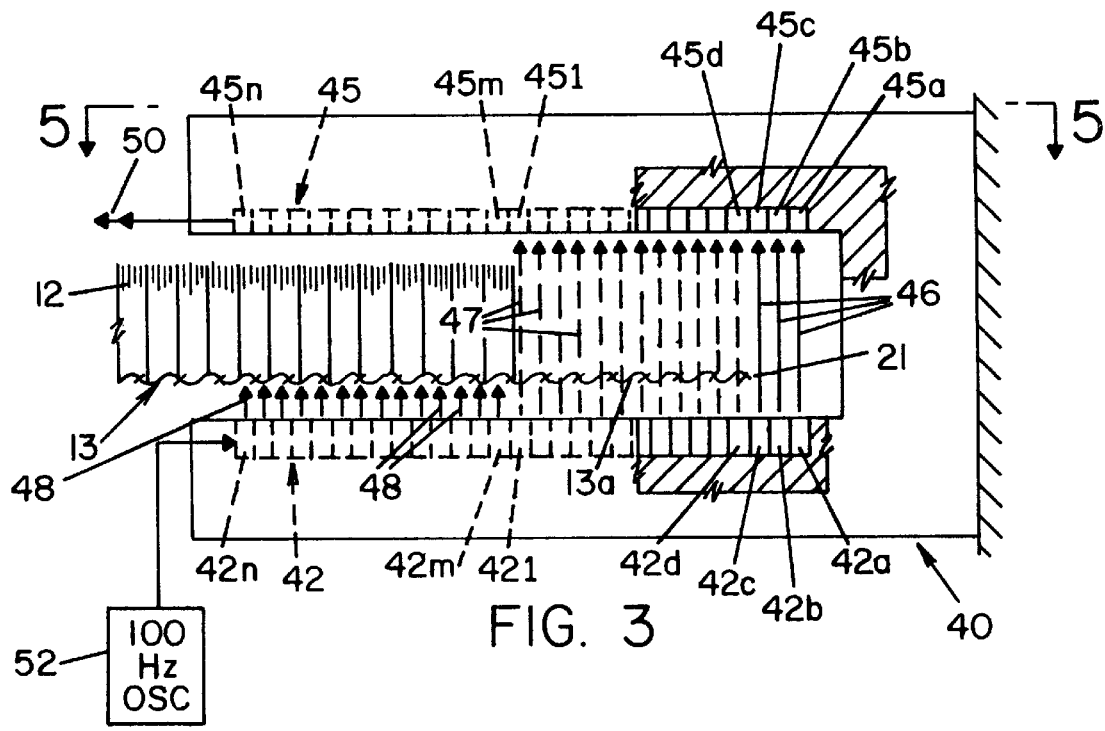
FIG. 3 is a schematic cross-sectional view of the detector of the present invention taken along lines 3—3 of FIG. 1.
Figure 5:
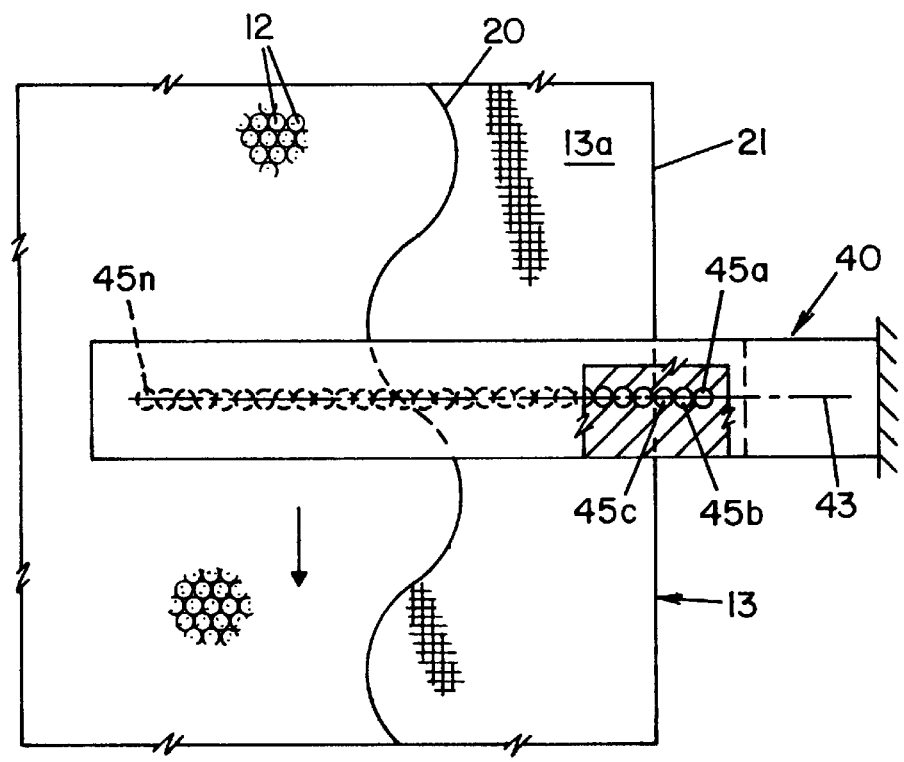
FIG. 5 is a plan view of the detector with sections broken away to illustrate the overlying position of the LEDs taken along line 5—5 of FIG. 3.

Referring now to FIGS. 3 and 5, position detector 40 includes a plurality of light sources 42 which in the preferred embodiment are LEDs (light emitting diodes) and individual LEDs are designated as 42a, 42b, 42c, . . . 42n. In the preferred embodiment, LEDs 42 emit infra red light. Those skilled in the art will recognize that other wave frequencies can be used in detector 40. Each LED 42a, 42b, 42c, ... 42n is arranged or situated on a line 43 which extends from a position outside primary backing width edge 21 towards the center of the carpet. LEDs 42 are placed on one side of the carpet and in the preferred embodiment, LEDs 42 are placed underneath primary backing material 13. On the opposite side of the carpet is a plurality of light sensors 45 which in the preferred embodiment are photo transistors with each individual photo transistor identified by a subscript, the plurality being designated as 45a, 45b, 45c, . . . 45n where in the preferred embodiment equals 64. Those skilled in the art will understand that other light sensors, such as photo diodes, can be used. Photo transistors 45 likewise extend on line 43 from a position outside primary backing width edge 21 towards the center of the carpet. In the preferred embodiment, each LED 42 is aligned with a corresponding photo transistor 45. Thus, LED 42a is aligned with photo transistor 45a, LED 45b is aligned with photo transistor 45b, etc. In the carpet application of the preferred embodiment, the number (64 in the preferred embodiment) of photo transistors 45 and LEDs 42 produce a wide field of view (FOV) which equates to a length of line 43 being over 4 inches. This FOV of the invention compares to a max FOV of prior art detectors of about 8 mm. Because pile edge 20 varies (as well as width edges, carpet widths, and carpet centerline) from one standard width carpet to the next, the set up time of the carpet making machine is reduced when the machine changes from one carpet type to another because detector 40 does not have to be readjusted. Also, should there be a run out of the carpet centerline while the machine is processing any given carpet, the wide FOV of detector 40 is better able to sense the run out while the error signal adjusts the drive and provide corrective action to minimize machine downtime. That is, should the carpet quickly shift, a wide FOV detector maintains the edge in its sight for corrective action. With a narrow FOV detector, the machine will simply go down if the edge passes out of the FOV.

Because of the somewhat simple sequencing technique (explained below) for activating LEDs 42 the spacing between adjacent LEDs 42a, b, c and photo transistors 45a, 45b, 45c, etc. and the spacing between LEDs 42 and photo transistors 45 is not especially critical. They are simply adjacent one another and spaced on lines 43 as close to one another as practically possible to enhance resolution. In this regard, power of the detector was increased to provide infra red light (as opposed to visible light) to assure detection by photo transistors 45. If other techniques are used to record sensor readings such as simultaneously actuating all LEDs, the LED light may have to be straightened or collimated to reduce cross-channel scatter attributed to light fan out. Such modifications are not needed in detector 40 of the preferred embodiment because the light sources are sequentially triggered in a scan. Only one LED 42a, 42b, 42c, etc. is on at a time and only its companion photo transistor 45a, 45b, 45c, etc. is enabled.

As best shown in FIG. 3, light emitted from LEDs 42a–42c is outside primary backing width edge 21 and passes undiminished to corresponding photo transistors 45a–45c. The undiminished light is represented by arrows in FIG. 3 designated by reference numeral 46. Light from LEDs 42d–42l pass through primary backing material 13 and in the process is attenuated. The attenuated light strikes photo transistors 45d–45l and is indicated by dashed arrows designated by reference numeral 47 in FIG. 3. Light emanating from LEDs 42m–42n is blocked by pile tufts 12 and is indicated as being blocked by shortened arrows in FIG. 3 designated as reference numeral 48. Photo transistors 45m . . . 45n do not receive any LED light and can not be activated. Photo transistors 45 transmit an output indicative of the light intensity sensed by it. In the preferred embodiment, the bias at which photo transistors 45 will trigger a signal is set at the intensity of attenuated light 47. Thus, photo transistors 45a . . . 45l will trigger from the light emitted from LEDs 42a . . . 42l while photo transistors 45m . . . 45n will not activate because LEDs 45m . . . 45n have blocked light 48. Thus, by determining the number of photo transistors 45m . . . 45n in the shadow of pile tufts 12, pile edge 20 position can be determined. More specifically, because photo transistors 45 are sequentially activated by determining which specific photo transistor 45a . . . 45n was the first (in time) to receive attenuated light, the precise location of pile edge 20 position is determined. As noted above, adhesive could be applied to primary backing material 13, but the adhesive is typically latex based and is generally transparent. The adhesive will not block LED light, but will attenuate LED light more than if an adhesive was not applied. When adhesive is used, the bias at which photo transistors 45 are triggered is adjusted accordingly.

In the preferred embodiment, only pile edge 20 is sensed. However, those skilled in the art will readily recognize that sensor 40 can be used to detect straight width edge 21 of primary backing material 13 or straight width edge 25 of secondary backing material 14 by simply setting the bias at which the photo transistors are triggered to correspond to a current (or voltage) developed by photo transistor 45 when sensing undiminished or nonattenuated LED light 46 which bias is not overcome (and hence photo transistor 45 not triggered) when attenuated LED light 47 is sensed. Detector 40*a* would be adjusted to operate on this basis. It is also possible to sense (after secondary backing material 14 is brought into registry with primary backing material 13 prior to entering tenter 16) the positions of secondary backing width edge 25 and primary backing width edge 21 in addition to determining undulating pile edge 20 by arranging the photo transistors in a gated manner to distinguish between levels of attenuated light. Specifically, attenuated light passing through primary and secondary backing materials 13, 14 (as well as less attenuated and undiminished light) will trigger a photo transistor voltage sufficient to pass through a first gate but not a second gate. Signals passing through the first gate will establish undulating pile edge 20. Less attenuated light passing only through primary backing material 13 will trigger a higher voltage passing through the second gate but not a third gate and the second gate signal will establish the position of secondary backing width edge 25. Unimpeded LED light will, in turn, pass through the third gate which will establish primary backing width edge 21. Other arrangements will suggest themselves to those skilled in the art who recognize that detector 40 can sense in any given scan undulating pile edge 20, primary backing width edge 21 and secondary backing width edge 25.

Figure 6:
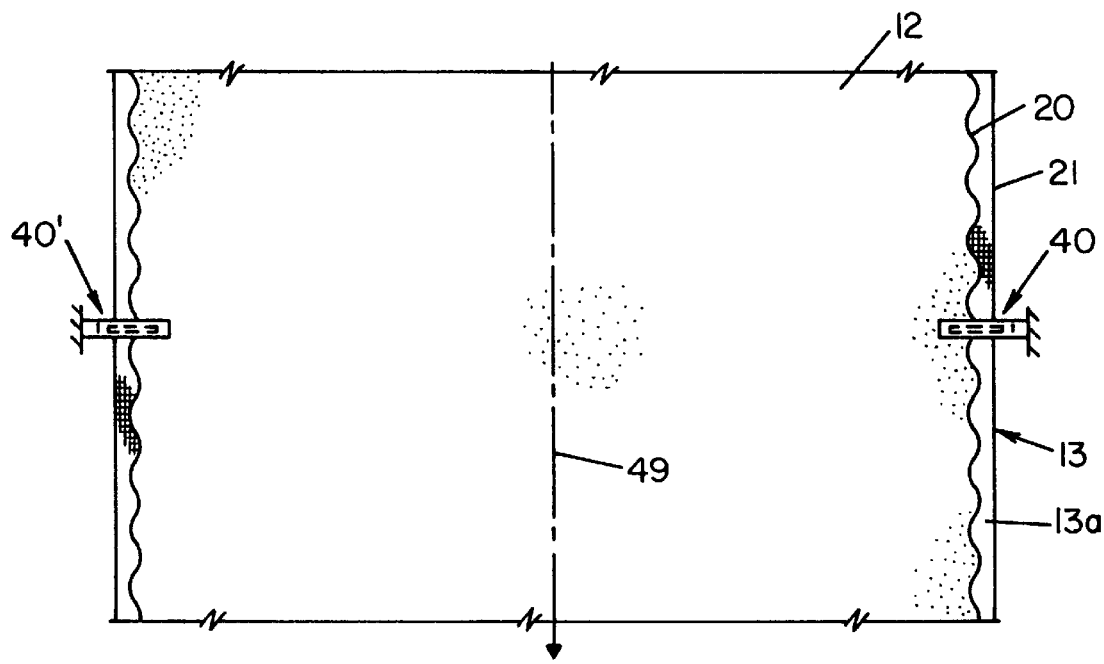
FIG. 6 is a diagrammatic plan view of the carpet illustrating the aligned positions of the opposing detectors.

Referring now to FIG. 6, there is shown a second detector designated 40' positioned at the opposite width edge of the carpet. Detector 40 has been described thus far as detecting undulating pile edge 20 at one side of carpet width edge 21, i.e., the right hand or the left hand side. Use of a second position detector 40' at the opposite width edge of primary backing material 13 permits determination of carpet centerline 49 by simply subtracting the two position readings of position detectors 40, 40'. It should be noted that centerline 49 when calculated on the basis of an averaged undulating pile edge 20 position may fractionally differ from a centerline calculated on the conventional basis of primary backing material edge 21 position. In either system, side edge area 13*a* is sufficient to allow tenter pins 17 to firmly grasp the carpet. However, positioning the carpet in tenter 16 by centering the carpet relative to the position of pile tufts 12 is preferred. For example, drying of the carpet tends to be more uniform promoting a more consistent process.

Figure 7:
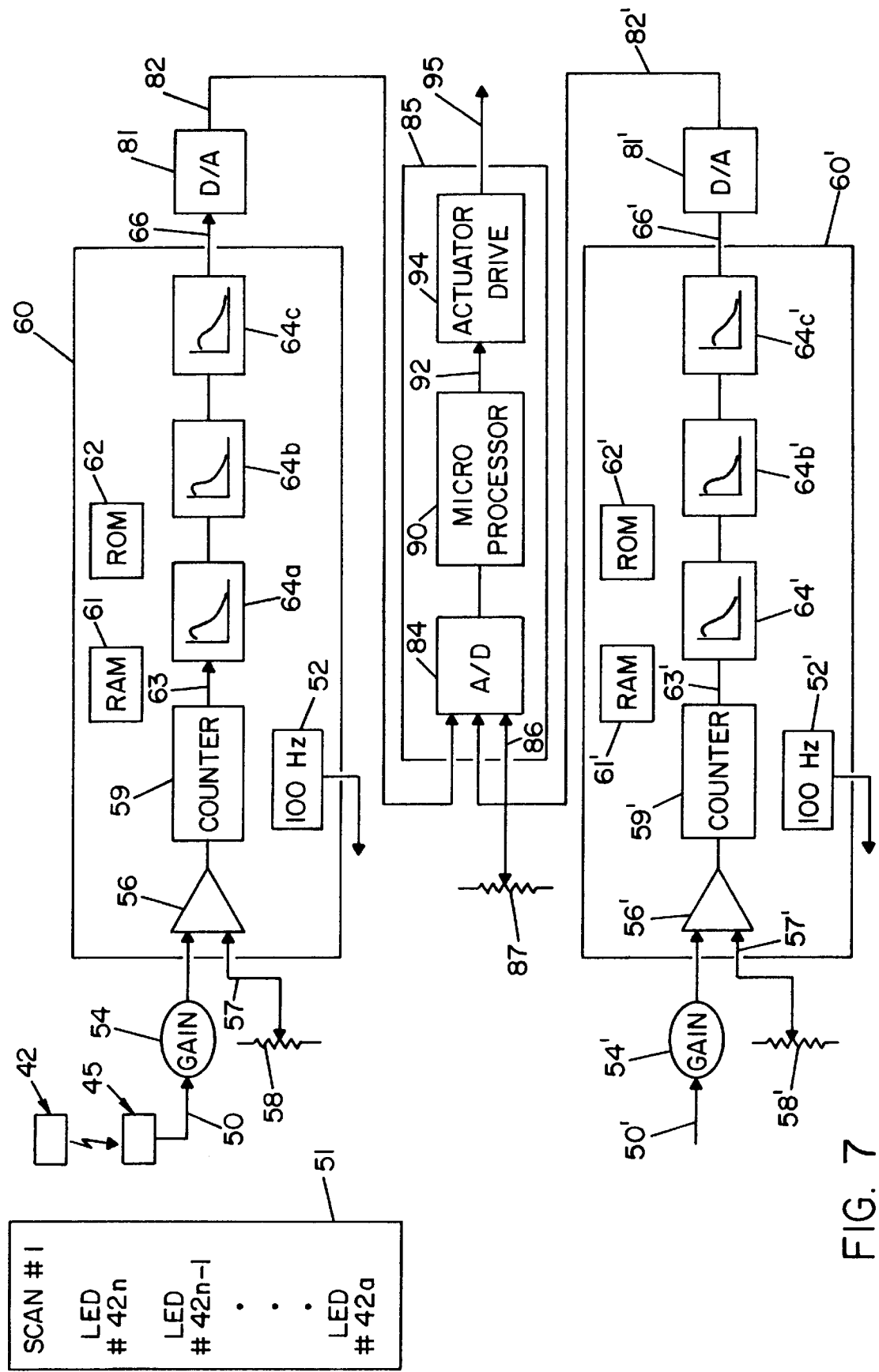
FIG. 7 is a general schematic arrangement of a center guiding system including two detectors of the present invention and a guiding amplifier.

Referring now to FIGS. 3 and 7, a clock circuit 52 is used to progressively activate LEDs 42*a*, 42*b*, 42*c* which are "on" or activated, in the preferred embodiment, in the range of about 10 to 15 $\mu$sec. to produce a scan as diagrammatically illustrated in FIG. 7 by reference numeral 51. In the preferred embodiment, clock circuit 52 produces about 100 scans per second although adequate readings could probably be obtained at a scan rate of about 50 scans per second.

As shown in FIG. 7, a sequence of photo transistor signals 50 are generated for each scan 51. Photo transistor signals 50, after being conventionally adjusted for gain at 54 are compared in a comparator 56 with a threshold signal 57 developed at an adjustable bias 58. Photo transistors 45*m* . . . 45*n* (those in the pile shadow) develop signals which do not pass through comparator 56. Photo transistor 451 develops an attenuated light signal which does pass through comparator 56. This signal, a digital "1" is counted, or alternatively the position "1" of the currently active transistor is noted by the microprocessor. The position "1" is known by the microprocessor because it is in control of which LED-photo transistor pair is currently active. At the end of a scan, the total number of photo transistor signals that produced a digital "1" is used as a measure of the position of the edge being sensed. Alternatively, the position of the first photo transistor that produced a digital "1" could be used as a measure of the position of the edge being sensed. Another method to determine the position of the edge would be to record the state (0 or 1) of the signal from every photo transistor and then use pattern recognition techniques to find the edge.

Microprocessor 60 which contains conventional RAM 61 and ROM 62 passes the digitized sensor signal from counter 59 to a digital filter. (The signal leaving comparator 56 is a digital signal and the signal leaving counter 59 is a digital position signal 63 because it identifies the specific photo transistor 451 which was the first photo transistor to receive attenuated light if the LED activating sequence started from inside to the carpet edge or the last photo transistor to receive attenuated light if the LED sequence started from outside the carpet and proceeded toward the center. In either sequence, the count of the photo transistor signals whether by a total number count or a first to occur count establishes tuft pile edge 20). The digital filter is a series of three (3) one pole filters 64*a*, 64*b*, 64*c*, which cascade digital position signal 63 to develop a digitally filtered position signal 66.

As previously explained, the edge of carpet tufting has a wave 22 or a scallop to it as it is being manufactured. From carpet to carpet, the scallop varies in amplitude and in the number of waves per foot. As the carpet moves through the manufacturing process it moves at a certain speed. That speed, measured in feet per second, combines with the number of waves per foot of the scallop to present a frequency, measured in waves per second, to position detector 40 looking at the carpet as it passes a particular point. A way to determine the average position of the scalloped edge of a carpet therefor, is to filter out the relatively high frequency scalloped part of the signal and use the remaining low frequency or average part of the signal.

In accordance with the preferred embodiment, position detector 40 uses a digital filter (infinite impulse response) to separate out the low frequency part of the signal. The filter has a steep roll off (3 pole). It is achieved for reasons of simplicity by cascading the data through a pole filter three (3) times as shown in FIG. 7. The digital filter comprises three one pole filters 64*a*, 64*b*, 64*c* with the output of the first one pole filter 64*a* cascaded as the input into the second one pole filter 64*b* with its output cascaded as an input into third one pole filter 64*c* to produce a digitally filtered signal 66 representing the average amplitude of undulating pile edge 20 at one side of the carpet.

Each of the one pole filters, 64*a*, 64*b* and 64*c*, is based on the following equation:

$$Y_n = (X_n + X_{n-1} + K_1 Y_{n-1})/K_2$$

Where:
$Y_n$ is the current filter output and $Y_{n-1}$ is the last (previous) filter output.

$X_n$ is the current filter input and $X_{n-1}$ is the last (previous) filter input.

$K_1$ and $K_2$ are constants chosen to give the desired filter characteristics based on the number of scans per second. In the preferred embodiment $K_1$ is set at 30 and $K_2$ is set at 32.

Figure 8:
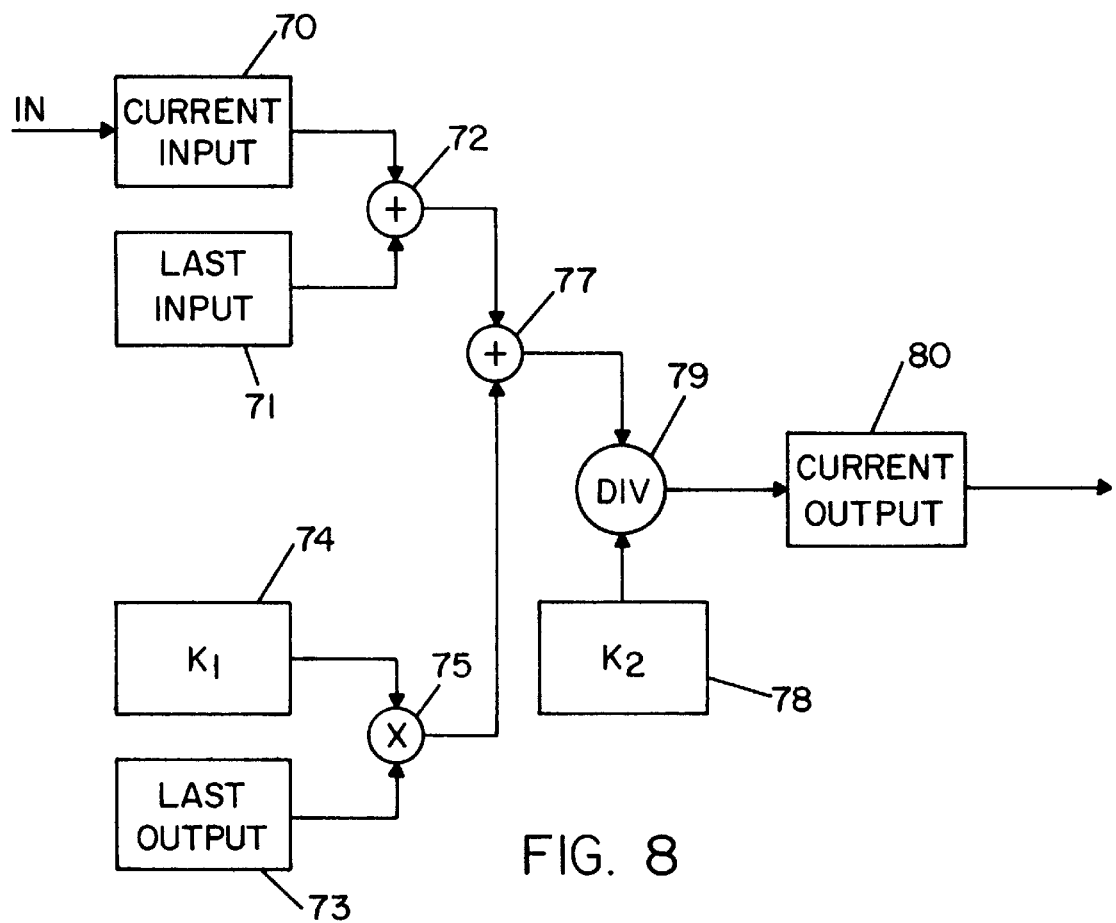
FIG. 8 is a diagrammatic representation of the steps performed by one of the one-pole filters used in the present invention; and, FIG. 9 is a graph showing the signals produced by the detector unfiltered and in a progressively filtered state.

Referring now to FIG. 8, there is shown a diagram of the one pole filter equation set forth above. The diagram is believed self evident and by way of quick explanation, current input block 70 is $X_n$ and last input block 71 is $X_{n-1}$ and is the previous filter input processed by that one pole filter. Blocks 70 and 71 are added at summing juncture 72 to produce a summed input. The last or previous output produced by one pole filter at block 73 and constant $K_1$ at block 74 are multiplied at multiplying juncture 75 to produce a multiplicand. The summed input signal from summing juncture 72 and the output multiplicand from multiplying juncture 75 are summed at summing juncture 77 and divided by block 78 representing constant $K_2$ at dividing juncture 79 to produce filter output 80.

Figure 9:
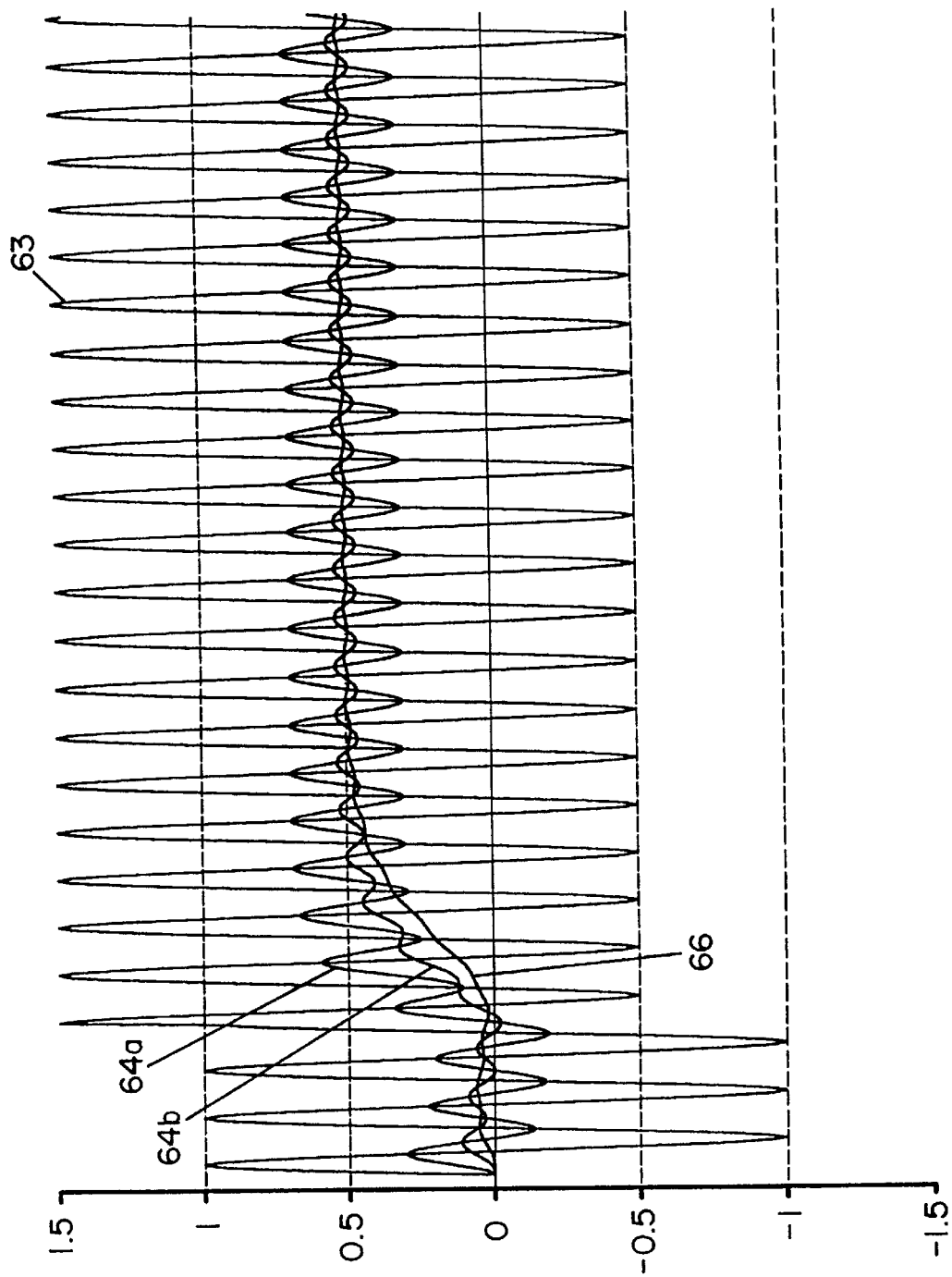

Referring now to FIG. 9, there is shown a trace or graph illustrating how each one pole stage filters the sensor signal. Digital position sensor signals 63 are shown as a solid large undulating line 63. The signal out from the first one pole filter 64a is shown as a smaller undulating line 64a. The signal out from the second one pole filter 64b is shown as a smooth line 64b. The signal out from the third one pole filter 64c is the digitally filtered signal 66 and is shown as a smooth solid line 66. As shown in FIG. 8, it can be observed that there was a step change in the average undulating pile edge position.

Referring again to FIG. 7, digitally filtered position signal 66 is converted to an analogue position signal 82 in digital to analogue block 81. As indicated in FIG. 6, the left hand detector 40' is similarly generating a digitally filtered position signal 66' for the left hand pile edge 20'. (As previously noted, the invention has been described relative to one edge position detector 40 which will be conventionally referred to as a right hand or right side edge detector. It is recognized that if an edge position is located a "centering" position can be developed on the assumption that the carpet has a given width. To accurately locate the carpet's precise centerline 49, a second detector 40' at the left hand edge of the carpet is used for reasons discussed above. The operation and construction of both detectors 40, 40' is identical and reference to the left hand detector and its components will be made with a prime, ', merely to distinguish the two). This is accomplished vis-a-vis microprocessor 60' in the same manner as described above and converted to an analogue position signal 82' in digital to analogue block 81'. Both analogue position signals 82, 82' are then digitized in an A/D converter 84 in a drive processor 85. Also inputted into A/D converter 84 is a set point signal 86 set by an adjustable bias 87 indicative of the centered position. Microprocessor 90 conducts a subtraction routine for the position signals 82, 82' to produce a centerline error signal, 92 used to adjust the actuator drive signal at block 94. The corrected actuator drive signal 95 is then used to drive actuator motor 35 in the preferred embodiment or, if secondary backing material is centered through detector 40a, actuator signal 95 will drive motor 32 vis-a-vis the error reading obtained from two detectors 40a, 40a'.

Those skilled in the art will readily recognize that by adjusting threshold signal 57, comparator 56 will only recognize light signals passing through primary backing material 13 but not secondary backing material 14 and can thus locate the edge of secondary backing material 14. Alternatively, threshold signal 57 signal could be adjusted so that comparator 56 will only generate a signal when photo transistors 45 receive unimpeded light and the detector will thus locate the edge of primary backing material 13. By adjusting the threshold signal detector can function as either detector 40 or detector 40a as shown in FIG. 1. It is also within the scope of the present invention that microprocessor 60 could be modified to simultaneously sense not only the absence of blocked light resulting from pile tufts to determine pile tuft edge 20, but also to determine when light passes through primary backing material 13 so that the edge of secondary backing material 14 can be detected and also to determine when light passes unimpeded to photo transistor 45 so that the edge of primary backing material 13 can be determined, i.e., detector 40b. One way to modify microprocessor 60 to accomplish such detection would simply be to tap photo transistor signal 50 to produce three (3) identical photo transistor signals each of which would be sent to a separate or dedicated comparator 56 with a threshold signal 57 adjusted to perform the desired light attenuation differentiation. Microprocessor 60 would in effect comprise three (3) microprocessors 60 to produce three (3) separate position signals 66 for each scan. Other microprocessor arrangements will suggest themselves to those skilled in the art.

The invention has been described with reference to a preferred embodiment. Alterations and modifications to the embodiments discussed herein will suggest themselves to those skilled in the art upon reading and understanding the Detailed Description of the Invention. For example, it is a specific feature of the invention to sequentially actuate LEDs 42 to produce a sequence of sensor (photo transistor) readings 50 which through a comparator 56 and timing circuit can easily and efficiently determine the position at which light of a given intensity passes through any object having varying degrees of translucency such as fabrics including flocked wall coverings or carpet. In accordance with a different scope of the invention, it is recognized that a detector can be constructed to sense various levels of light attenuation to improve the operation of fabric making machines particularly fabrics such as carpet which have material of varying transparencies at their width ends. In accordance with this aspect of the invention, any number of detector designs using photo diodes or other sensors coupled in a logic circuit or a digital computer and whether actuated sequentially or simultaneously, would fall within the scope of the invention. It is intended to include all such modifications and alterations insofar as they come within the scope of the invention.

Having thus described the invention it is claimed:

1. In a carpet making machine of the type in which generally opaque tufts of carpet pile are affixed to an open weave, somewhat transparent primary backing material in an offset row pattern to cause said pile tufts to form a longitudinally extending, undulating pile tuft edge approaching and receding from the longitudinally extending side width edges of a carpet defined by said primary backing material, the improvement comprising:

a) a first plurality of light sources spaced from one side of said carpet, said plurality of light sources extending, on a line at spaced increments from one width edge of said carpet towards the center of said carpet;

b) a first plurality of signal generating light sensors positioned on the opposite side of said carpet extending on a line and aligned with said first plurality of light sources so that each light sensor can sense any light passing from an aligned light source through said primary backing material while light is blocked by said opaque tufts;

c) a signal processor including a clock for sequentially actuating each light source and a corresponding sensor in registry with an actuated light sensor in a scan regularly repeated while said carpet travels past said sources and sensors, said signal processor determining from a set light attenuation level sensed by said sensors the average position of said undulating pile tuft edge as said carpet passes between said light sources and said light sensors; and a d) centering mechanism responsive to said signal processor for maintaining said carpet centered within said carpet making machine by the average position of the pile tuft edge.

2. In a carpet making machine of the type in which generally opaque tufts of carpet pile are affixed to an open weave, generally transparent primary backing material in an offset row pattern to cause said pile tufts to form a longitudinally extending, undulating pile tuft edge approaching and receding from the longitudinally extending side width edges of a carpet defined by said primary backing material, the improvement comprising:

a) a first plurality of light sources spaced from one side of said carpet, said plurality of light sources extending, at spaced increments from one width edge of said carpet towards the center of said carpet;

b) a first plurality of signal generating light sensors positioned on the opposite side of said carpet and aligned with said first plurality of light sources so that each light sensor can sense any light passing from an aligned light source through said primary backing material while light is blocked by said opaque tufts;

c) signal processing means effective when said light sources are activated to determine from said light sensor signals the average position of said undulating pile tuft edge as said carpet passes between said light sources and said light sensors; said signal processing means includes clock means for sequentially actuating each light source in said plurality of light sources during any given periodic scan to produce a corresponding sequence of light sensor signals and comparator means comparing each light sensor signal to a threshold light attenuation level to determine, for each scan, the average position of said pile tuft edge and d) centering means responsive to signal processing means for maintaining said carpet centered within said carpet making machine.

3. The improvement of claim 2 further including a second plurality of incrementally spaced light sources at one side of said carpet extending from the opposite width edge of said carpet towards the center of said carpet and a second plurality of signal generating light sensors at the opposite side of said carpet and aligned with said second plurality of light sources so that each light sensor senses attenuated light passing from an aligned light source through said carpet.

4. The improvement of claim 3 further including said carpet having a generally transparent, adhesive coated, secondary backing material affixed to said primary backing material, said machine having first guide rolls means for conveying said primary backing material through said machine; second guide rolls means for conveying said secondary backing material through said machine; tenter means downstream of said first and second guide roll means for bonding said secondary backing to said primary backing and trimming the carpet width edges to commercially supplied widths; said light sources and sensors positioned on opposite sides of said carpet upstream of said tenter means and prior to application of said secondary backing material and said centering means effective to adjust at least one of said first and second roll means whereby the width position of said primary and secondary backing material is centered by the carpet centerline relative one another and relative to said tenter.

5. The machine of claim 4 wherein said second guide roll means includes an actuator for shifting the transverse position of said secondary backing material and said centering means controlling said actuator.

6. The improvement of claim 3 wherein said light sources and said sensors are positioned upstream of said tenter and downstream of said first and second guide roll means whereby said light sources and said sensors extend across said carpet after said secondary backing material has been applied to said primary backing material.

7. The improvement of claim 6 wherein said signal processing means comprises clock means for sequentially actuating each light source in said plurality of light sources during any given periodic scan to produce a corresponding sequence of light sensor signals and comparator means comparing each light sensor signal to a threshold light attenuation level to determine, for each scan, the average position of said pile tuft edge.

8. The improvement of claim 7 wherein said signal processing means further includes counter means for determining the position of a specific sensor which first exceeded said threshold light attenuation level.

9. The improvement of claim 7 wherein said signal processing means further includes counter means for determining the total number of sensors which exceeded or did not exceed said threshold light attenuation level to determine the position of said pile tuft edge for a scan.

10. The improvement of claim 7 further including means to variably adjust said threshold for determining the edge position of said primary backing material.

11. The improvement of claim 6 wherein any given sensor has means associated therewith to distinguish between light from an opposing LED which is i) not attenuated, ii) attenuated when passing through said primary backing material and iii) further attenuated when passing through said secondary backing material and said primary backing material, said signal processing means effective to process said signals to determine in addition to the average position of said undulating pile tuft edge, the relatively straight width edge positions of said secondary backing material and said primary backing material.

12. The improvement of claim 2 wherein said light sources are LEDs.

13. The improvement of claim 12 wherein said light sources are LEDs powered to emit infra red light and said sensors are photo transistors.

14. The improvement of claim 13 wherein said LEDs and said photo transistors extend at fixed increments on a line outside the carpet to a position towards the center of said carpet, said line extending a fixed length sufficient to produce an edge detector with a wide field of view.

15. The improvement of claim 14 wherein said signal processing means further includes means to calculate from said position signals generated from said first and second pluralities of said sensor an average carpet centerline signal.

16. The improvement of claim 15 wherein said signal processing means further includes filter means removing certain frequencies from the signal to determine said average position, said filter means including at least two one pole, cascaded filters.

17. The improvement of claim 16 wherein each one pole filter filters the signal in accordance with the following routine:

$Y_n = (X_n + X_{n-1} + K_1 Y_{n-1})/K_2$ where $Y_n$ is the current filter output and $Y_{n-1}$ is the last (previous) filter output, and $X_n$ is the current filter input and $X_{n-1}$ is the last (previous) filter input and $K_1$ and $K_2$ are constants.

18. The improvement of claim 2 wherein said signal processing means further includes counter means for determining the position of a specific sensor which first exceeded said threshold light attenuation level.

19. The improvement of claim 2 wherein said signal processing means further includes counter means for determining the total number of sensors which exceeded or did not exceed said threshold light attenuation level to determine the position of said pile tuft edge for a scan.

20. The improvement of claim 2 further including means to variably adjust said threshold for determining the edge position of said primary backing material.

21. The improvement of claim 2 further including means to variably adjust said threshold for determining the edge position of said secondary backing material.

22. The improvement of claim 2 further including said carpet having a generally transparent, adhesive coated, secondary backing material affixed to said primary backing material, said machine having first guide rolls means for conveying said primary backing material through said machine; second guide rolls means for conveying said secondary backing material through said machine; tenter means downstream of said first and second guide roll means for bonding said secondary backing to said primary backing and trimming the carpet width edges to commercially supplied widths; said light sources and sensors positioned on opposite sides of said carpet upstream of said tenter means and prior to application of said secondary backing material and said centering means effective to adjust at least one of said first and second roll means whereby the width position of said primary and secondary backing material is centered relative one another and relative to said tenter.

23. The improvement of claim 22 wherein said signal processing means comprises clock means for sequentially actuating each light source in said plurality of light sources during any given periodic scan to produce a corresponding sequence of light sensor signals and comparator means comparing each light sensor signal to a threshold light attenuation level to determine, for each scan, the average position of said pile tuft edge.

24. The improvement of claim 23 wherein said signal processing means further includes counter means for determining the position of a specific sensor which first exceeded said threshold light attenuation level.

25. The improvement of claim 23 wherein said signal processing means further includes counter means for determining the total number of sensors which exceeded or did not exceed said threshold light attenuation level to determine the position of said pile tuft edge for a scan.

26. A detector especially suited for detecting edge positions of fabric as it is processed through a fabric making machine, said fabric having varying degrees of transparencies at its width ends, said detector comprising:

a) a first plurality of light sources extending along a line from outside the fabric width edge towards the center of the fabric, said light sources positioned on one side of said fabric;

b) a plurality of light sensors on the opposite side of the fabric with each sensor aligned with a corresponding light source, said light sensors emitting analog sensor signals when receiving light from said light sources;

c) clock circuit means for sequentially actuating each light source in said first plurality of light sources at a given scan frequency;

d) means to compare each of said sensor signals with a set threshold signal indicative of a set light intensity and generate a position signal when any sensor signal exceeds said threshold signal;

e) means to count said position signals to determine a distance correlated to a position on said fabric whereat said fabric permits light of a set intensity to pass therethrough; and, f) means to filter each signal to produce a filtered position signal indicative of a width end position of said fabric.

27. The detector of claim 26 wherein said means to count determines a specific photo transistor position signal which is the first in time to exceed said threshold signal in said comparator means for any given scan to determine said distance.

28. The detector of claim 26 wherein said means to count includes counting all said position signals or all said light sensor signals which did not exceed said threshold signal to determine said distance for any given scan.

29. The detector of claim 26 wherein said comparator means further includes an adjustable threshold signal against which said sensor signal is compared, said threshold signal indicative of the intensity of attenuated light passing through said fabric.

30. The detector of claim 29 wherein said comparator means generates a digital signal when a sensor signal exceeds said threshold signal and said means to count is a digital processor.

31. The detector of claim 30 wherein said filter means is a digital, low pass filter comprised of at least two one pole cascaded filters.

32. The detector of claim 31 wherein each one pole filter filters the signal according to the following calculation:

$$Y_n = (X_n + X_{n-1} + K_1 Y_{n-1})/K_2$$

where $Y_n$ is the current filter output and $Y_{n-1}$ is the last (previous) filter output, and $X_n$ is the current filter input and $X_{n-1}$ is the last (previous) filter input and $K_1$ and $K_2$ are constants.

33. The detector of claim 30 wherein said light sources are LEDs emitting infra red light and said light sensors are photo transistors.

34. The detector of claim 33 wherein said fabric is a carpet.

35. The detector of claim 34 further including a second detector having a second plurality of LEDs on one side of said carpet extending along a line from the width end opposite that from the edge said first plurality of LEDs extended from; a second plurality of photo transistors on the opposite side of said carpet, each photo transistor in said second plurality aligned with a corresponding LED in said second LED plurality; and means to calculate the centerline of said carpet from said first and second filtered position signals.

36. A process for making carpet in which tufts of carpet pile are applied to a generally transparent primary backing material in offset rows to produce at the width edges of the carpet undulating waves of pile tufts approaching and receding from the width edges of the primary backing material which defines the carpet width edge, said process comprising the steps of:

a) conveying by guide rolls said primary backing material with carpet pile affixed thereto to a position adjacent a tenter;

b) conveying a generally transparent secondary backing material from a pay out reel through at least one adhesive tank by guide rolls into an aligned position, underlying and contacting said primary backing material to form a composite backing adjacent said tenter;

c) providing upstream of said tenter and upstream of the position whereat said secondary backing material contacts said primary backing material, on one side of said primary backing material a plurality of LEDs on a line extending from a point beyond the width edge of said primary backing material towards the center of said carpet and on the opposite side of said primary backing material a plurality of photo transistors aligned with said plurality of LEDs;

d) generating a plurality of centering signals, each indicative of the average tuft pile width position as said carpet travels past said plurality of LEDs and photo transistors by i) sequentially activating said LEDs during a scan, each scan conducted at a set frequency to produce a sequenced plurality of light sensor signals from said photo transistors, said photo transistors set to distinguish attenuated light passing through said primary backing material;

ii) determining in each scan the number of photo transistor signals which exceeded a set attenuated light threshold value and generating a position signal in response to that determination; and iii) filtering said position signal to produce for each scan a centering signal;

e) adjusting said secondary backing material guide rolls by said centering signal to achieve centered alignment of said secondary backing material with said average tuft pile width positions; and f) transferring said composite backing onto the pins of said tenter for precisely stretching said composite material, drying said adhesive and trimming said carpet width edges to commercial carpet width sizes.

37. The process of claim 36 further including the additional steps of providing a second plurality of LEDs and photo transistors at the opposite width edge of said carpet to likewise develop second centering signals from said second plurality and determining from said centering signals developed by said first and second centering signals an error signal for positioning said guide roll relative to the centerline of the carpet.

38. A moving web edge detector comprising a) a first plurality of light sources extending along a line from outside the web towards the center of the web, said light sources positioned on one side of the web;

b) a second plurality of light sensors extending along a line on the opposite side of the web, each sensor generally aligned with a corresponding light source;

c) a clock circuit for sequentially actuating each light source in the first plurality and sequentially enabling an aligned sense to sense the light emitted from an actuated light source in a periodically affected scan; and, d) a CPU signal processor evaluating the light intensity sensed by the sensors in each scan to determine the location of the web edge from the position and/or number of sensors actuated when light intensities at or above a set intensity has been detected.

39. The detector of claim 38 wherein said web comprises at least two materials adhered one on top of the other, one of the materials defining the web edges and the other material spaced from the web edge, the web edge material being somewhat transparent whereby attenuated light can be detected by said sensor, said signal processor further including a comparator for comparing the intensity of the light detected by said sensors to a set value, said signal processor considering any given sensor activated when the light intensity detected by said given sensor equals or exceeds said set value whereby the detector can detect the edge position of the web edge material and/or the edge position of the spaced material.

40. The detector of claim 39 wherein the spaced material of the web has an undulating edge surface and said signal processor further includes at least two cascaded pole filters filtering the frequencies of the sensor signals equaling or exceeding a set value sufficient to detect attenuated light passing through the web edge material while ignoring unattenuated source light whereby the average undulating edge of the spaced material is detected.

41. The detector of claim 40 wherein the web material is a flocked wall covering or a carpet with a tufted pile.

\* \* \* \* \*